July 3, 1956 — D. D. ERDMAN — 2,753,131

HANDLE REEL

Filed Dec. 21, 1954

INVENTOR

DONALD D. ERDMAN

United States Patent Office 2,753,131
Patented July 3, 1956

2,753,131
HANDLE REEL

Donald D. Erdman, Kodiak, Territory of Alaska

Application December 21, 1954, Serial No. 476,754

2 Claims. (Cl. 242—96)

This invention relates to fishing reels.

It is an object of the present invention to provide a fishing reel adapted for use without a rod of the spin and side unreeling type, and is particularly useful where the fish plug, bait or net and the like is too heavy to be cast with a pole and must be cast underhand and wherein a non-backlashing reel is desired.

It is another object of the present invention to provide a fishing reel adapted for use without a rod wherein the reel may be wound by one hand while the reel assembly is held in the other hand and which can be used for spinning off the end and reeling off the side.

It is still another object of the present invention to provide a fishing reel of the above type having a short handle attached for convenience in carrying and which includes pressure washer means for controlling the feed of a line.

For other objects and a better understanding of the invention, reference may be had to the following detailed description taken in connection with the accompanying drawing, in which.

Figure 1:
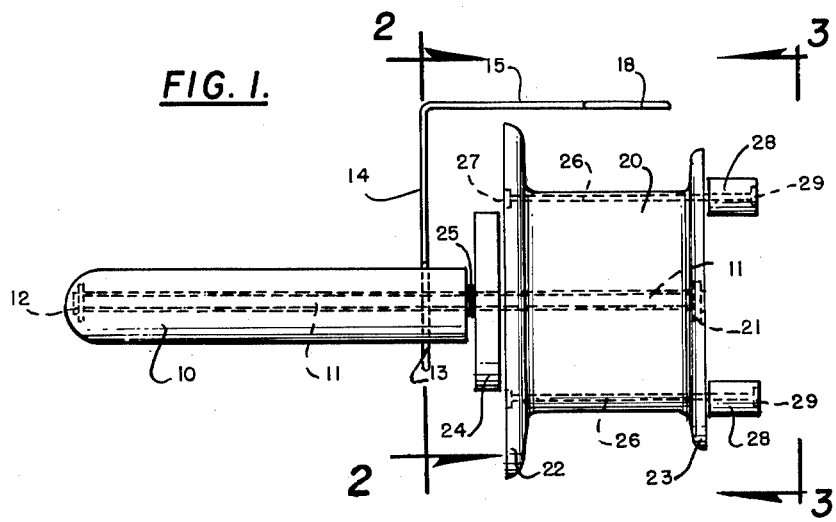
Figure 1 is a side elevational view of a preferred embodiment of the invention.
Figure 2:
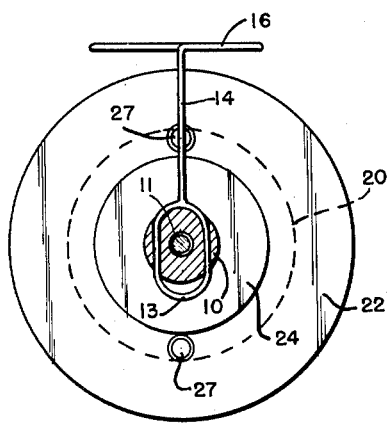
Fig. 2 is a vertical sectional view thereof taken along the line 2—2 of Fig. 1.
Figure 3:
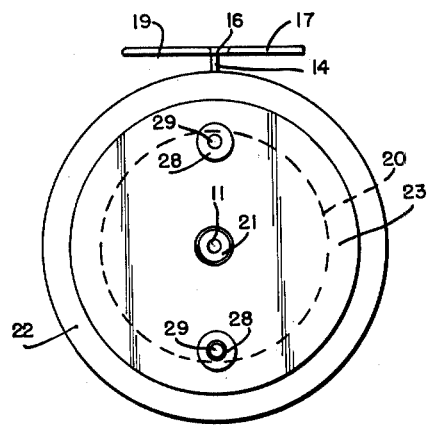
Fig. 3 is an end elevational view thereof looking along the line 3—3 of Fig. 1.

Referring now more in detail to the drawing, 10 represents a relatively short handle supporting a shaft or axle 11 held in position by a collar 12 located within a recess provided at the end of the handle, the shaft 11 extending beyond the other end of the handle 10, substantially as illustrated.

Figure 4:
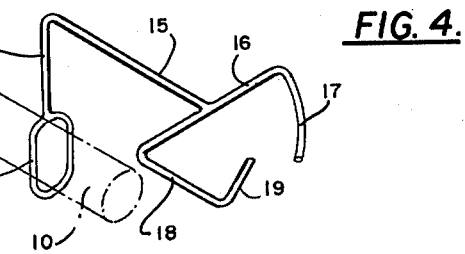
Fig. 4 is a perspective view of the line guiding member.

A line guiding member is provided and includes an oblong loop (Fig. 4) 13 which passes through laterally aligned openings provided in the handle 10, the upper end of the loop 13 being integrally formed and provided with a vertical portion 14 which continues in a horizontal portion 15 bent at right angles thereto. The free end of the horizontal portion 15 is formed with a transverse portion 16 disposed at right angles thereto, one end of the transverse portion 16 being provided with a curved inwardly extending terminal 17 while the other end of the transverse portion 16 is formed at right angles thereto with a straight portion 18 which terminates in the inwardly bent terminal 19, it being noted that the free end of the terminal 19 is freely spaced from the free end of the terminal 17 to permit the line to be threaded therethrough.

A spool member 20 is rotatably mounted on the end of the shaft 11, being retained thereon by means of a collar 21 secured to the end of the shaft and received within a corresponding recess at the outer end of the spool member. The spool member 20 includes a rearwardly disposed flange 22 of greater diameter than the forwardly disposed flange 23. A friction washer 24 is provided on the shaft 11 intermediate the flange 22 and the handle 10, a spacer washer 25 being mounted on the shaft 11 intermediate the end of handle 10 and the friction washer 24.

To permit the winding of the spool member 20 with the line therearound, a pair of oppositely disposed shafts 26 are journalled through the flanges 22, 23 and spool member 20, the shafts 26 being retained against displacement in a forward direction by means of the collars 27 (Fig. 1) keyed thereon and received within corresponding recesses provided in the outer face of the flange 22 with the other ends of the shafts 26 extending beyond the flange 23 and rotatably mounting thereon the handles 28. Collars 29 are secured to the ends of the shafts 26 and are received within corresponding recesses provided in the ends of the handles 28 whereby to retain the latter on their respective shafts.

The handles 10, 28, spool member 20 and the friction washer 24 may be formed of metal, plastic, wood or other suitable material and the shape and size of the components illustrated in the drawing may, of course, be varied within the scope of the invention.

In use, the handle 10 is held in one hand and the end of the line wound on the spool member 20 and connected to the fishing plug, net, bait or the like, is held in the other hand, permitting a few feet of line to unreel whereupon the fish plug, bait, net or the like is cast underhand. Pressure is applied to the friction washer 24 by the thumb and forefinger to stop the unreeling of the line. The guide member is rotated to a position above the spool member 20 and is not employed for casting. For reeling, the hand is turned forward and down to bring the line within the guide member, threading the same through the space between the ends of the terminals 19 and 17. A spin cast can be stopped by turning the shaft 11 at right angles to the line, catching the line around the side of the spool member and applying pressure to the friction washer 24.

While various changes may be made in the detail construction, it shall be understood that such changes shall be within the spirit and scope of the present invention as defined by the appended claims.

What I claim as new and desire to protect by Letters Patent of the United States is:

1. A reel assembly comprising a substantially horizontal hand grip handle, a shaft extending through one end of said handle, a friction washer mounted upon the shaft in spaced relation from the end thereof, a spool member rotatably mounted upon the shaft, outwardly of said friction washer, line guiding means mounted upon said handle and adapted to extend over said spool member, means for rotating said spool, a spacer washer on said shaft intermediate said friction washer and the end of said handle, said friction washer being adapted to bear on the end of said spool member, said line guide means comprising an oblong loop passing through laterally aligned openings in said handle, an upwardly extending substantially vertical portion at the upper end of said loop continuing in a horizontal portion toward said spool member at right angles to said vertical portion, a transverse portion at the end of said horizontal portion at right angles thereto, a curved portion at one end of said transverse portion extending inwardly towards the longitudinal axis of said spool member and away from said horizontal portion, a straight portion at the other end of said transverse portion extending parallel to said horizontal portion away from said loop, and an inwardly bent portion at the other end of said straight portion extending toward said curved portion, the ends of said inwardly bent portion and said curved portion being spaced apart to permit the threading of the line therethrough.

2. A reel assembly according to claim 1, said means for rotating said spool member comprising a pair of oppositely disposed shafts journalled near the outside of said spool member, said shafts extending beyond the forward end of said spool member, handles rotatably mounted on the extended ends of said oppositely disposed shafts, and means for retaining said handles on said shafts and said shafts within said spool member.

References Cited in the file of this patent

UNITED STATES PATENTS

| 664,640 | Huebner | Dec. 25, 1900 |
| 1,554,323 | Bauerle et al. | Sept. 22, 1925 |
| 2,692,093 | Tengesdal | Oct. 19, 1954 |